Nov. 26, 1968 N. E. POLSTER ET AL 3,413,647

DIGITAL ANALOG RECORDER

Filed Feb. 8, 1963 5 Sheets-Sheet 1

Nov. 26, 1968 N. E. POLSTER ET AL 3,413,647

DIGITAL ANALOG RECORDER

Filed Feb. 8, 1963 5 Sheets-Sheet 2

United States Patent Office 3,413,647

Patented Nov. 26, 1968

3,413,647

DIGITAL ANALOG RECORDER

Norman E. Polster, Southampton, Raymond W. Ross, Cheltenham, and Albert J. Williams, Jr., Philadelphia, Pa., assignors to Leeds & Northrup Company, a corporation of Pennsylvania Filed Feb. 8, 1963, Ser. No. 257,258
14 Claims. (Cl. 346—14)

ABSTRACT OF THE DISCLOSURE

A recorder system in which there is provided number display means disposed adjacent a record chart and in alignment with a limited area of the chart, the number display means being in electrical circuit with stylus means for selective energization to produce a readable number corresponding to the significant figure of the digital value of a condition being recorded on the chart by the stylus means.

This invention relates to apparatus for the production of a digital analog record of one or more variables at a fast sampling rate and has for an object the provision of an improved digital analog recorder for recording at relatively high speed one or more input variables in a form whereby both an indication of the trend of the variable is observable from the record and the precise digital value thereof.

The present invention is particularly concerned with the production of what may be termed an "abridged-analog-decimal" record as distinguished from an "unabridged-analog-decimal" record. In the unabridged-analog-decimal type, there is produced, from a smooth continuous change in the measured quantity, curves which proceed smoothly from left to right. In the abridged-analog-decimal type of the present invention, a smooth continuous increase in the measured quantity results in curves which proceed in steps from left to right. This results from the fact that quantized information is used to position the small marks which make up the curve and the information is quantized since this is the nature of all digital information.

In the copending application of Albert J. Williams, Jr., filed Feb. 8, 1963, Ser. No. 257,257 now U.S. Patent 3,214,764, there is disclosed the method of using two digits in establishing the position of each mark making up the curve so as to avoid reading errors and to provide a smooth curve relatively free of spurious steps in order to give a better display. In such method, the position of a mark on the chart is determined, in part, by the next less significant digit in the numerical value. The method involves marking the chart with a plurality of groups of spaced calibration lines with each group including ten spaces corresponding to digits from 0 to 9. The chart is also marked within the spaces with marks which correspond to the magnitude of the variable, the position of a mark within a space being within a predetermined area to one side or the other of the middle of the space depending upon whether the succeeding digit in the numerical value of the variable is less than five or five or more. In the preferred form of the method, the position of the mark within a space will be either at the one-quarter location or at the three-quarter location in the space depending upon whether the succeeding digit, i.e., the next less significant digit, in the numerical value of the variable is less than five or five or more. Thus, with two marking positions for each of the ten spaces, this method may be referred to as the twenty position marking system.

In accordance with the present invention, there is provided an improved recording system for performing the aforesaid method. Such system comprises means for feeding a record chart along a predetermined path at a controlled rate of speed, and stylus means for marking the chart within limited areas. The stylus means includes a plurality of styli adapted for selective energization to produce on the chart at a location within a limited area a mark corresponding in position to a significant figure of the digital value of a digit. The stylus means comprises at least two groups of styli with each of the groups including eleven styli spaced equidistantly apart for producing on the chart spaced calibration lines which form ten spaces corresponding to digits from 0 to 9 and two styli disposed between each of the aforementioned eleven styli for marking in the spaces at predetermined locations.

Further in accordance with the present invention, there is provided number display means disposed adjacent the chart and in alignment with the limited area of the chart, the number display means being in electrical circuit with the stylus means for selective energization to produce a readable number corresponding to the significant figure of the digital value of the digit. Systems of the present type provide curves relatively free of spurious steps in order to give a better display.

Further in accordance with the invention, there is provided the subcombination of stylus means comprising a substantially flat back-up member of electrical insulating material and a plurality of styli supported by the back-up member at spaced locations. Each of the styli consists of resilient material having good electrical conductivity and having a narrow portion which extends from the back-up member and a portion secured to the back-up member which includes a butt contact receiving area having a greater transverse dimension than the narrow portion which extends from the back-up member. Stylus means produced in accordance with the present invention is of the unitized styli type and it is relatively inexpensive to produce as well as being readily replaceable.

For a more detailed disclosure of the invention and for further objects and advantages thereof, reference is to be had to the following description taken in conjunction with the accompanying drawings in which.

Figures 1, 4, 4A:
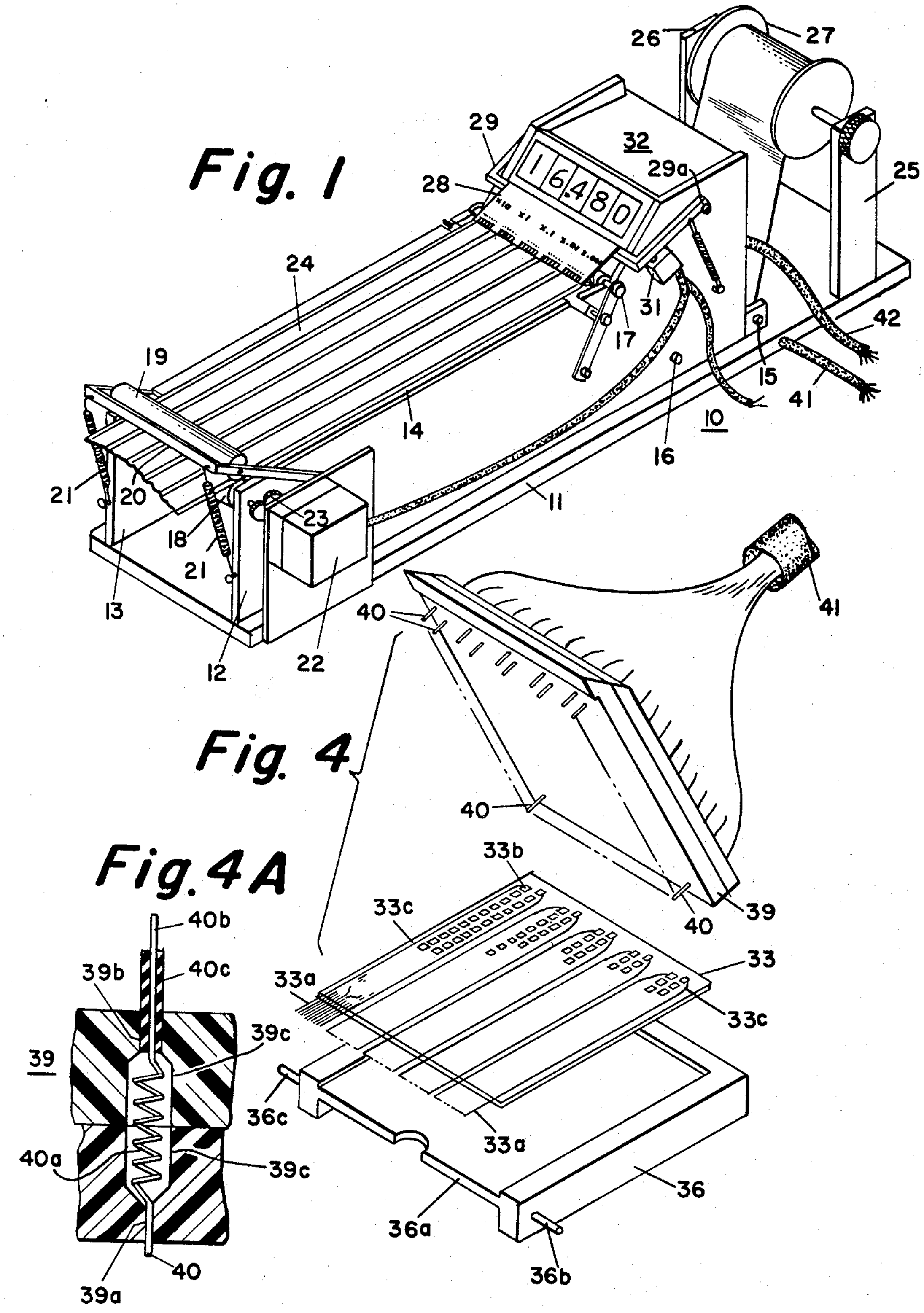
FIG. 1 is a perspective view of a single channel recorder embodying the present invention.
FIG. 4 is an exploded view on enlarged scale showing the replaceable stylus card of this invention together with the cooperating mounting means and contact means therefor.
FIG. 4A is a fractional view of one of the spring contacts of FIG. 4.
Figure 2:
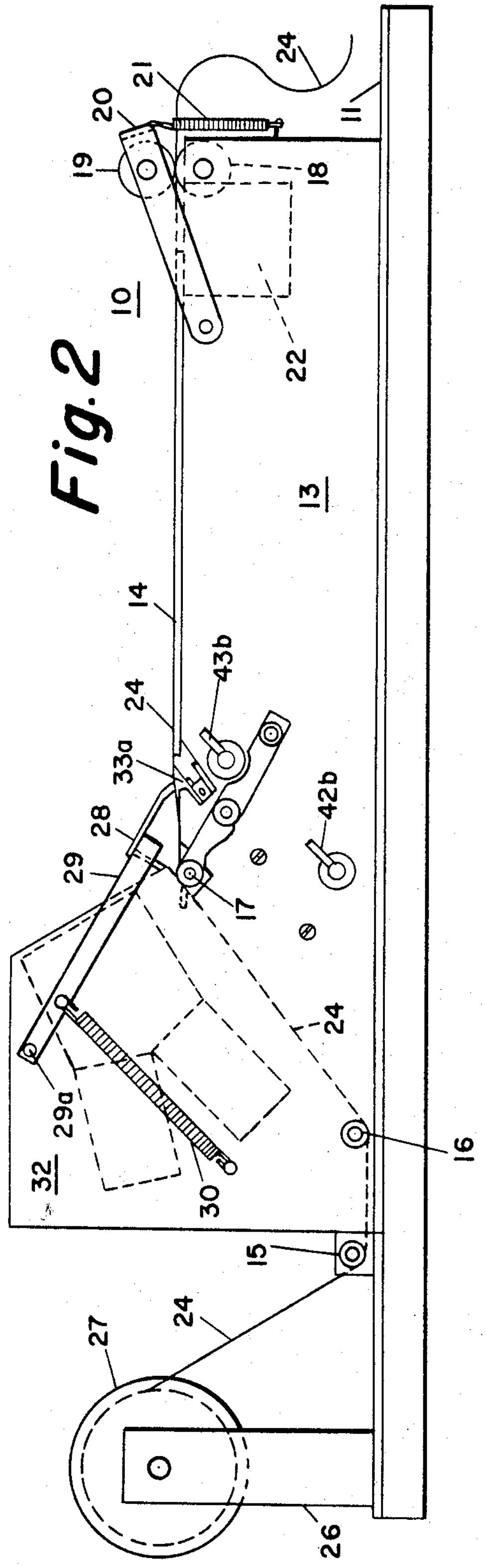
FIG. 2 is a side elevational view of the recorder shown in FIG. 1.
Figure 3:
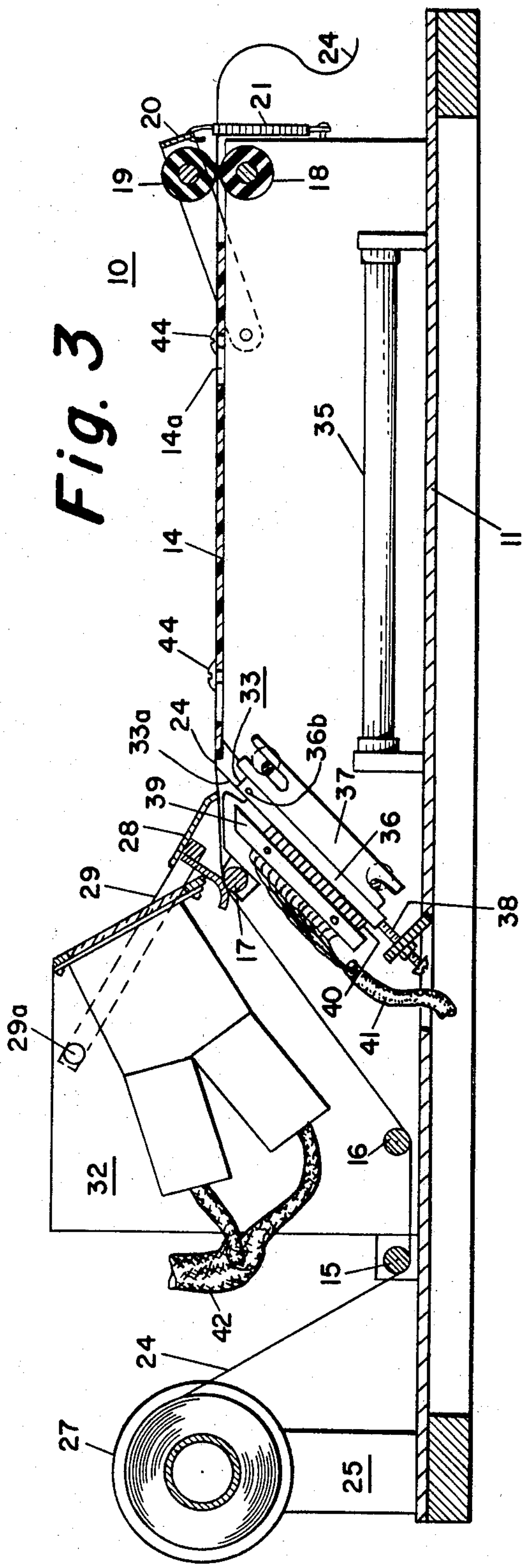
FIG. 3 is a side elevational view similar to the view in FIG. 2 and partly in section illustrating certain details of the recorder.

Referring to FIG. 1, there is shown a recorder 10 including an improved stylus unit of the stationary type and having twenty measuring line marking styli in addition to eleven styli for producing the calibration lines on the record chart. The recorder 10 is provided with a base 11 for supporting various elements of the recorder. The recorder includes a pair of side plates 12 and 13 which together with the base 11 form a supporting frame. As will be understood, various other forms of supporting structure may be used. The frame supports a chart backup plate 14 and a plurality of chart guide rods 15, 16 and 17 extending between the side plates 12 and 13. The frame additionally supports a pair of pinch rolls 18 and 19. The bearings for the roll 18 are mounted in the side plates 12 and 13 and the roll 19 is carried by bearings in a U-shaped frame 20 pivoted to the side plates and biased toward the roll 18 by springs 21. The pinch roll 18 is driven by a timing motor 22 through suitable gearing 23 to advance the chart 24 at a predetermined rate of speed. The base plate 11 also supports a pair of members 25 and 26 which support a chart supply roll 27. As best shown in FIGS. 2 and 3, the chart 24 is threaded under the chart guide rods 15 and 16, over the chart guide rod 17 and between the pinch rolls 18 and 19. A conventional re-roll for the chart may be utilized in a manner well known in the art.

The timing motor for driving the chart 24 is controlled by a switch 31, FIG. 1, mounted on the side of plate 12. The switch 31 is adapted to be actuated by a bracket 29 to close the circuit to motor 22 as the bracket is lowered thereby insuring forward motion of the chart 24 prior to pushing the chart into contact with the styli 33*a* of stylus card 33, FIG. 4, later to be described. The bracket 29 is pivoted from the side plates 12 and 13 at 29*a* and is biased toward the chart by springs 30 which function as overcenter springs to either hold the bracket 29 in the position shown or hold it up out of the way. The bracket 29 supports an index plate or scale 28 which overlies the chart in the area of recording. The index plate 28 not only is helpful in interpreting the record produced on the chart by the styli 33*a* but also holds the chart in contact with the styli 33*a* during the recording operation. When the index plate 28 is lifted from the chart 24, the chart will continue to move forward until it is clear of the styli 33*a*. This arrangement protects the relatively delicate styli from being caught in the paper 24 and being deformed beyond their elastic limit.

As may be seen in FIG. 1, the recorder 10 has been illustrated as of the single channel type and includes provision for recording numerical values up to five digits. In the particular example illustrated, provision has been made for recording a numerical value to three decimal places and the maximum number to be recorded would be 99.999. It is, of course, to be understood that the position of the decimal point may be changed as desired depending upon the magnitude of the variables being recorded.

The marks are applied to the chart 24 by means of the styli 33*a* of the stylus card 33. Since the recorder 10 is adapted to record a five digit number, the stylus card 33 includes five groups of styli 33*a*, FIG. 4. Each group of styli is adapted to produce one of the five decimal digits and each group includes 31 styli, as more clearly shown in FIGS. 6 and 7. Eleven of the styli in each group are used for producing eleven calibration lines which form ten spaces corresponding to digits from 0 to 9. The remaining twenty styli in each group are used for marking the chart between appropriate calibration lines to record the decimal digit of the magnitude of the variable in accordance with the twenty position marking method. This will be described more in detail below. As will be seen in FIG. 3, the styli 33*a* of the stylus card 33 are adapted to be held in contact with the underside of chart 24. As shown in FIG. 4, each of the styli 33*a* includes a contact area 33*b* which is adapted to make electrical contact with a corresponding one of contact pins or elements 40 of an electrical contact block 39. The stylus card 33 is supported in a holder 36 which, as shown in FIG. 3, is adapted to be slid into position by means of guide elements 37 which guide the holder 36 into engagement with an adjustable stop screw 38. As will be further described in connection with FIGS. 4 and 5, the guide elements 37 are arranged to move the holder 36 and consequently the contact areas 33*b* of the stylus card 33 into engagement with the cooperating contact pins 40, the latter being connected through an electric cable 41, FIGS. 1 and 3, with means for energizing the various styli 33*a* in accordance with the value of the measured variable.

It will be recognized that the manner of marking the record chart 24 is of the well known type where the styli receives energizing pulses and the resulting voltages and currents produce marks on the chart. The method of recording by sparking or heating styli is well understood by those skilled in the art. In general, when the stylus produces a mark on the chart, it is in the form of a small perforation. This perforation may be through the chart or merely through a coating on the chart. For example, where the chart comprises an insulating strip coated on one side with a metal coating, the chart 24 is threaded through the recorder 10 so that the metal coating is on the underside of the chart strip so that the styli 33*a* will engage the metal coating. When the energizing pulses are applied to the styli 33*a*, they produce small perforations in the metal coating of the chart. Since the insulating portion of the chart is translucent, light shining through the perforations or traces made in the metal coating will enable an observer to read the record. In the recorder 10, as shown in FIG. 3, there is provided a chart backup plate 14 which is made of transparent or translucent material such, for example, as glass or clear plastic and there is additionally included a lamp 35 which illuminates the chart 24 from the underside so that the small perforations are clearly visible from above.

Figure 10:
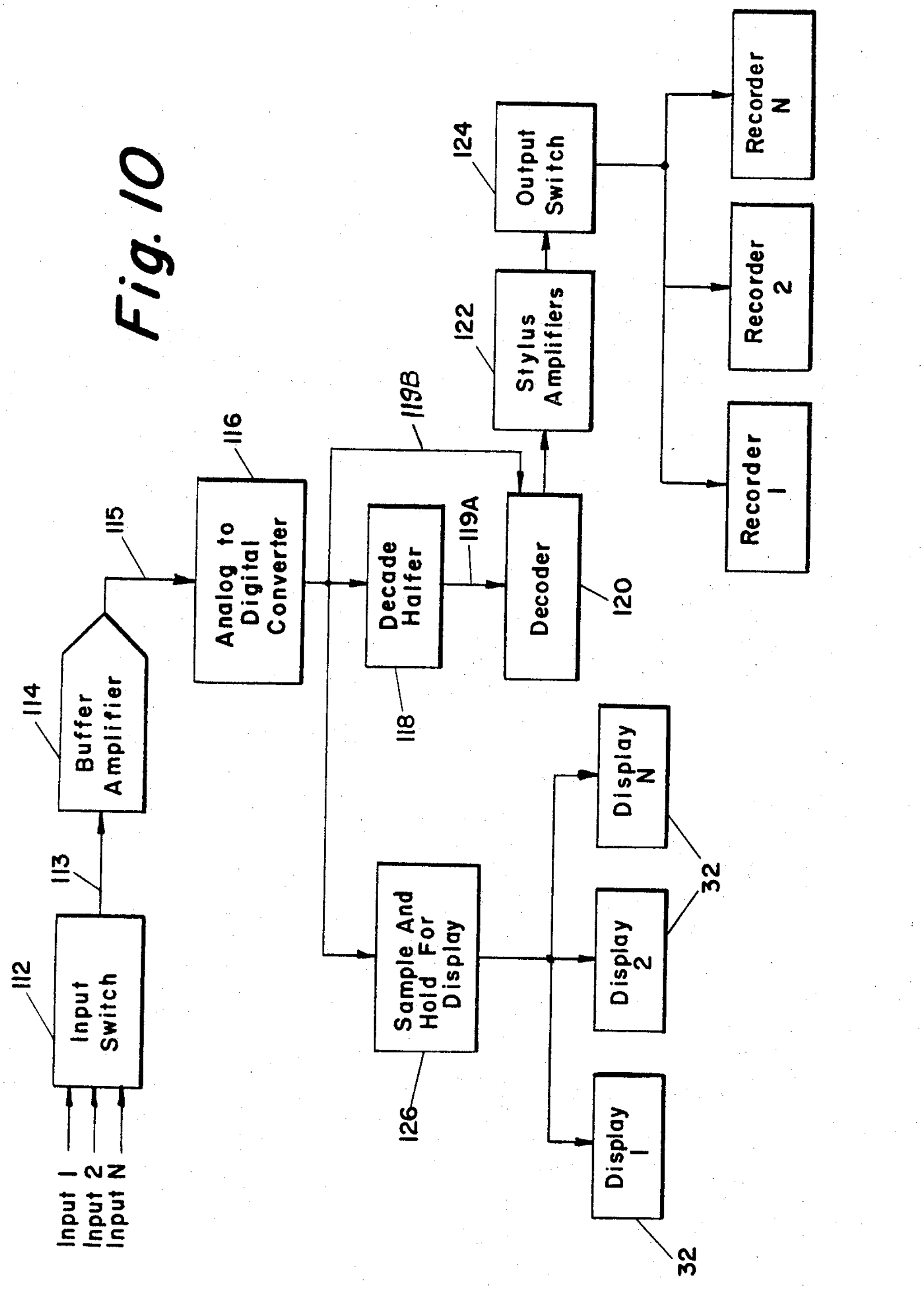
FIG. 10 is a block diagram of the electrical circuit of the recorder in FIG. 9.

As may be seen in FIG. 1, the index plate or scale 28 is provided with markings corresponding to the eleven calibration lines which form the ten spaces corresponding to digits from 0 to 9 which are produced on the record chart 24 by the styli 33*a*. There are five groups of such markings for each of the five digits in the numerical display 32. The numerical display 32 shows the value of the condition being recorded at any given time and it is positioned immediately adjacent chart 24. The digital display 32 may be comprised of a group of indicator lights with the screen for each group being in line with the corresponding groups of calibration lines for each digit in the number as shown in FIG. 1. The indicator lights which make up the digital display 32 may be of the type sold by Industrial Electronic Engineers, Inc. and designated as Series 120,000 Digital Display. Briefly, such a display comprises a lamp for each digit and the positions of the lamps being such that each lamp will project a different number on the front viewing screen. These lamps are connected by means of a cable 42 to means for effecting selective illumination in accordance with the energization of the selected styli 33*a* and in accordance with the cycle of data sampling as later described in connection with FIG. 10.

The general operation of the digital analog recorder having been described above, various novel construction features thereof will now be described more in detail. Referring to FIG. 4, it will be seen that the stylus card holder 36 for card 33 comprises a three-sided member having a bottom support 36*a* and pins 36*b* and 36*c* which extend from the opposite sides of the holder 36 and serve as handles for installing and removing the frame 36. The bottom support 36*a* is spaced below the upper face of the holder or frame 36 by an amount equal to the thickness of the stylus card 33. The stylus card 33 is adapted to rest on the bottom support 36*a* and by clamping means later to be described in connection with FIG. 5, the holder 36 and stylus card 33 are moved toward the contact block 39. The contact block 39 supports a plurality of contact pins 40, there being one contact pin for each contact area 33*b* of the associated styli 33*a*. The contact pins 40 are arranged in five groups corresponding to the five groups of contact areas 33*b* and corresponding to the five digits to be recorded by the recorder 10. As may be seen in FIGS. 4 and 4A, the contact block 39 comprises two sections of suitable electrical insulating material such, for example, as the plastic material available commercially under the trade-name "Lucite." Each of the sections of the contact block 39 is provided with a passageway 39*a* and 39*b* extending therethrough. The passageways 39*a* and 39*b* are counterbored at 39*c* to provide cavities which when associated together as in FIG. 4A provide a housing for receiving a spring portion of the contact 40. The contacts 40 are formed of electrically conducting spring wire which extends through each of the passageways 39*a* and 39*b* through the block 39. The wire includes an intermediate portion 40*a* in the form of a helix which provides spring pressure for the contact portions 40 of the wire which extends beyond the face of the block 39. The passageway 39*b* has a diameter larger than the diameter of passageway 39*a* since the portion of the wire 40*b* at the rear of the contact block 39 is provided with an insulation sleeve 40C which is adapted to extend into the passageway 39*b*, FIG. 4A. The spring wire from which contacts 40 are made in the modification shown in FIG. 4A should be of a type which is capable of retaining its resiliency such as, for example, phosphor bronze spring wire or equivalent. This construction provides the necessary spring pressure for the contacts 40 and eliminates the need for soldering leadwires to the contact areas 33*b*.

Figures 5, 6, 7:
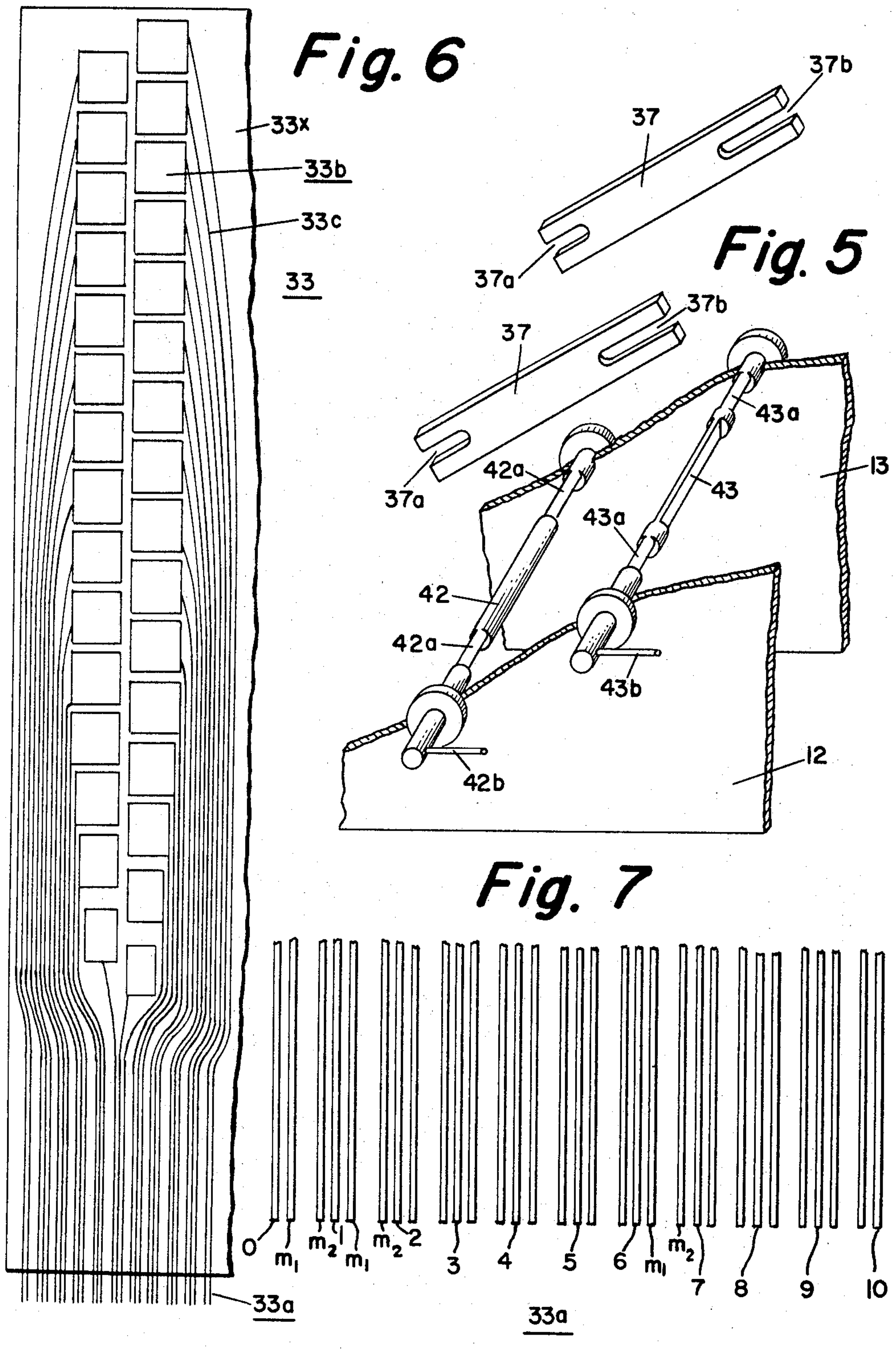
FIG. 5 is an exploded view of the adjustable mount structure for the stylus card.
FIG. 6 is an enlarged fractional plan view illustrating one group or decade of styli and the terminals for electrical connections thereto.
FIG. 7 is an enlarged plan view of the styli shown at the lower end of FIG. 6 for producing a preferred form of record.

Referring now to FIG. 5, it will be seen that each of the guide members 37 includes elongated slots 37*a* and 37*b* at the opposite ends thereof. The slots 37*a* are adapted to engage off-center crank members 42*a* of an eccentric shaft 42. The eccentric shaft 42 is journaled between the frame members 12 and 13 and includes a handle 42*b* for rotating the shaft 42. The slots 37*b* of the pair of members 37 are adapted to engage similar off-center crank portions 43*a* of an eccentric shaft 43 which likewise is journaled to the side plates 12 and 13 and includes a handle 43*b*. By adjusting the handles 42*b* and 43*b* of the respective eccentric shafts 42 and 43, it will be seen that the guide members 37 are adjustable toward and away from the contact block 39 as shown in FIG. 3. This adjustment effects engagement of the contact areas 33*b* of the stylus card 33 with the corresponding contact pins 40 of contact block 39. By operation of the handles 42*b* and 43*b*, the stylus card 33 is locked in operating position or may be released therefrom when it is desired to install a new stylus card.

As previously described in connection with FIG. 3, the recorder 10 includes a chart backup plate 14 which is mounted on the side plates 12 and 13 by means of screws 44. The mounting holes 14*a* in the backup plate 14 are elongated in order that the plate 14 may be slid toward the pinch rolls 18 and 19 at the righthand end of FIG. 3 to facilitate insertion and removal of the stylus card frame 36. Assuming that a new stylus card 33 is to be inserted, it will be placed in the frame 36 in the manner illustrated in FIG. 4. The end of the frame 36 remote from the handles 36*b* and 36*c* is then inserted through the opening which exists when the backup plate 14 has been moved to the right in FIG. 3 so that the lefthand ends of slots 14*a* are against the screws 44. In order for the frame 36 to be inserted, the handles 42*b* and 43*b* of the eccentric shafts 42 and 43 must be turned so that the off-center crank portions 42*a* and 43*a* are away from the contact block 39. Under these conditions, the frame 36 can be slid into engagement with the stop screw 38 which controls alignment of the contact areas 33*b* of the stylus card 33 with the contact pins 40 of the contact block 39. After the frame 36 with its stylus card 33 has been inserted, the handles 42*b* and 43*b* are rotated to lock the frame 36 and the stylus card 33 in place. The chart backup plate 14 may then be moved to the left to the position shown in FIG. 3 and the screws 44 tightened. The backup plate is kept close to the delicate styli during operation of the recorder to minimize up and down motion of the chart where it is contacted by the styli and unnecessary continued flexing of the latter. Additionally the styli are better protected from damage should someone push down on the chart.

As described above in connection with FIG. 4, the novel stylus card 33 includes 5 groups of styli 33*a* and associated contact areas 33*b*. Since each of the groups is identical, only one group has been shown on enlarged scale in FIG. 6. The electrical contact areas 33*b* are connected to the corresponding styli 33*a* by electrical conducting paths 33*c*. The stylus card 33 with its electrical conducting portions 33*a*, 33*b*, and 33*c* may be produced by various suitable techniques such, for example, as by printed circuit techniques, micromilling or chemical etching. The stylus card 33 comprises a rigid base member 33*x* of electrical insulating material. For example, the base member 33*x* may comprise a rigid sheet of plastic material or it may comprise a glass plate. It has been found that the printed circuit type of electrical conducting portions of the stylus card may be produced by utilizing a thin sheet of beryllium copper affixed to a glass plate. By processes well known to those skilled in the art, the unwanted copper material is etched or otherwise removed leaving the desired electrical conducting circuit pattern on the plate 36 as shown in FIG. 6. The technique of producing such stylus cards is relatively inexpensive and by using a good electrical conductive spring material, such as beryllium copper, for the styli they will effect a resilient contact with the chart. Since the stylus card is of relatively low cost, it is economically feasible to replace the stylus card with a new one when the styli become bent or worn.

As will be seen in FIG. 7, there is illustrated on enlarged scale the styli 33*a*. The styli 33*a* are adapted to extend over the edge of the rigid base or support plate 33*x* of the stylus card. In each of the styli groups corresponding to each digit of a multi-digit number, there are 31 styli. Eleven of the styli indicated by numbers 0 to 10, FIG. 7, are used to produce eleven calibration lines which in turn form the ten spaces corresponding to digits from 0 to 9. It will be noted that the styli for producing the calibration lines are equally spaced and two measured quantity marking styli *m*1 and *m*2 are positioned between each of the eleven calibration line styli. In a particular embodiment, the calibration line styli 0 to 10 were placed on about 1 millimeter centers, thus being spaced from adjacent calibration line styli by about .040". The measuring styli *m*1 and *m*2 were spaced on ½ millimeter centers or about .020" between each other. The measuring line styli *m*1 and *m*2 were spaced to represent the one-quarter and three-quarter position in each space formed between adjacent calibration line styli. The purpose for this spacing will be further described below in connection with the marking method illustrated in FIG. 8. From the foregoing it will be seen that as the styli proceed from left to right in FIG. 7, the zero calibration line stylus will be positioned first in the series and the first marking stylus *m*1 will be positioned about .010" from it between centers. The second marking stylus *m*2 is positioned about .030" between centers from the zero calibration line stylus and the number one calibration line stylus is positioned about .040" between centers from the zero calibration line stylus. The number 2 calibration line stylus is positioned about .080" from the zero calibration line stylus and the remaining calibration line styli and marking line styli are positioned at corresponding increasing distances with respect to the zero calibration line stylus as shown in FIG. 7. Since both the calibration line styli and marking line styli are part of a single unit assembly and produce marks at the same time, the proper relationship between them is always assured.

The recorder 10 of applicant's invention is adapted to utilize the aforesaid method claimed in U.S. Patent 3,214,764, and produces a multi-decade digital analog record of an abridged type which provides a better analog display and tends to eliminate reading errors as a number in a decade changes from 9 to 0, for example, as when the number changes from 49 to 50, 69 to 70, 79 to 80 and so forth. For a better understanding of this, reference is to be had to FIG. 8 wherein there is digitally displayed the five digit number 16.480 associated with a record of the type produced in accordance with the aforesaid method. Below each digit is a group of vertical lines representing the calibration lines for the decade. These are produced on the chart by corresponding groups of eleven calibration line styli, a representative group being shown in FIG. 7 with the calibration line styli identified by the numbers 0 to 10. The calibration lines are recorded on the chart 24 at the same time the five digit value of the variable is being recorded thereon by predetermined ones of the marking styli *m*1, *m*2 for each decade. For recording the value of each digit, twenty marking styli are available, i.e., ten of *m*1 and ten of *m*2. In this arrangement, the value for a particular digit is recorded on the chart in either the one-quarter position by one of the marking styli *m*1 or in the three-quarter position by one of the marking styli *m*2 between pairs of calibration marks. Looking at FIG. 8, it will be seen that there is a decimal point between the 6 and the 4 produced by illumination of the decimal point lamp in association with the numeral 4 in the indicated number, i.e., 16.480, as in FIG. 1, thus providing two digits 1 and 6 to the left of the decimal point. The digit 6 is in the units column and the digit 1 is in the tens column. If the digit in the units column is 5 or greater, the digit in the tens column will be recorded in three-quarter position. Since the digit in the units column is 6 and thus is greater than 5, the digit 1 in the tens column has been recorded in the three-quarter position as shown on line 1 of the record. However, if the digit in the units column were 4 or less, the digit in the tens column would have been recorded in the one-quarter position. Since the decimal point has been assumed as being between the second and third digits in the number as 16.480, the digit 4 is in the tenths column, the digit 8 is in the hundredths column and the digit 0 is in the thousandths column. It is observed that in the first line on the record beneath the numerals, the digit 4 is recorded in the three-quarter position. This is due to the fact that the digit in the hundredths column is 5 or greater, namely an 8. However, if the digit in the hundredths position had been 4 or less, then the digit 4 in the tenths column or decade would have been recorded in the one-quarter position. It will further be noted that the digit 8 in the hundredths column has been recorded in the one-quarter position. This results from the fact that the number in the thousandths position is less than 5, namely a 0. If the digit in the thousandths column had been 5 or greater, then the 8 would have been recorded in the three-quarter position.

Figures 8, 9:
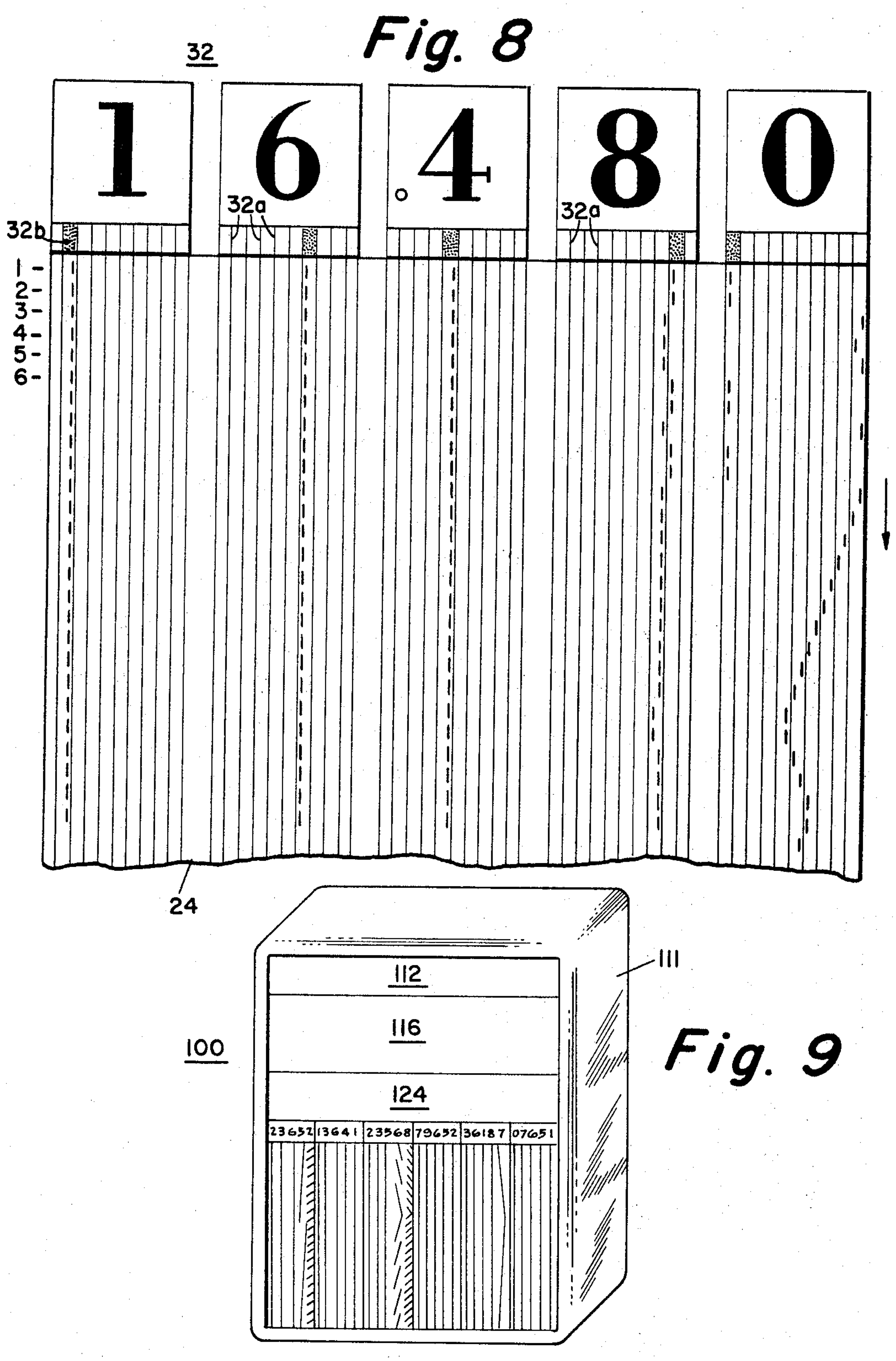
FIG. 8 is a view on enlarged scale illustrating the multi-digit, multi-column record arrangement useful in explaining the preferred type of record.
FIG. 9 is a perspective view diagrammatically illustrating a multi-channel recorder similar to the single-channel recorder of FIG. 1.

Looking back at the second line of recorded information, it will be seen that the markings are in the same positions as those in the first line. However, in the third line, it will be seen that the markings in the hundredths and thousandths column have changed positions from 80 to 79. It will further be noted that the mark in the 7 space in the hundredths column has been recorded in three-quarter position and the mark in the 9 space in the thousandths column has been recorded in the three-quarter position. In the fourth line, the digits recorded in the hundredths and thousandths columns are still in the 7 and 9 spaces respectively. However, the mark in the 9 space is in the one-quarter position rather than the three-quarter position. In the fifth line, it will be noted that the mark in the 9 space in the thousandths column is again in the three-quarter position. In the sixth line of recorded information, it will be seen that the markings are the same as those on the first and second lines and that the recorded number corresponds to 16.480. While the foregoing changes between 79 and 80 have been taking place in the hundredths and thousandths columns, the markings in the first three columns of the number have remained the same. This indicates that the five digit numeral has been varying between 16.480 and 16.479.

Where the value is fluctuating between 9 and 0, as has been the case described above in connection with the thousandths column, there has heretofore been considerable chance for error in reading the chart where the markings have been placed centrally of the spaces between calibration lines. With a slowly moving chart (so that the dashes of FIG. 8 are compressed to mere dots and the spaces between these dots are missing) and with prior methods of recording the information midway between calibration lines, it has been extremely difficult to determine whether the recorded numerals were 79 and 80 or whether the 7 should be associated with the zero mark in the thousandths column and the 8 associated with the 9 mark in the thousandths column thus providing readings of 70 and 89. Either of the latter would inject a substantial error in reading the record. This chance for reading error is eliminated by the twenty-position method where the position of a mark within a space is confined to a predetermined area to one side or the other of the middle of the space depending upon whether the succeeding digit in the numerical value in the magnitude is less than five or five or more. Although there may be two marks in the hundredths column indistinguishable in time and two marks in the thousandths column indistinguishable in time, improper pairing of these marks could only be made by a grossly negligent observer. This method has the further advantage of providing better fidelity for the analog display of any measured quantity which varies with time in that the quantizing steps are reduced in size so the eye and mind of the observer more readily can visualize the smooth curve which would be the unabridged display. It is desirable to have twenty marking styli in all decades so the curve shape which conveys the essential information to the observer may be most apparent in any of the decades depending upon the magnitude and speed of the changes in the measured quantity. Thus, it will be seen that in FIG. 8 in the thousandths column the markings are in either the first or third quarter positions showing that the recorded information may be read with some justification to an additional decimal place even though such additional decimal place is not actually recorded in a separate column. This is particularly apparent from the lower portion of chart 24 as shown in FIG. 8 where the markings in the thousandths column appear as staggered pairs of short vertical lines or marks. It will be recalled that the chart moves down in the direction of the arrow shown at the right of FIG. 8. Thus, the information recorded on line one of the chart is the last information recorded. As the value of the digit in the thousandths column decreases, the markings in the appropriate spaces of that decade will appear first in the three-quarter position and then in the one-quarter position in the space. Similarly, as the value increases, the marking will appear first in one-quarter position of the space and then in the three-quarter position. This gives a curve, as shown from the lower half of the thousandths column in FIG. 8, which appears smoother because the steps are only one-half of a space in width. In judging smoothness, consideration must be taken by the 4 to 1 enlargement of FIG. 8. The figure should be held at least forty inches away from the eye.

Additionally, in FIG. 8, it will be noted that the digital display 32 has associated therewith an illuminated representation 32*a* of the corresponding calibration lines for each of the groups or decades. To further aid in reading the record on the chart 24, the illuminated calibration lines 32*a* are provided with a bright spot 32*b* in the space corresponding to the position of the recorded mark. Thus, it will be seen that illuminated spots 32*b* are in the appropriate spaces in the respective groups or decades corresponding to the digits which make up the display number 16.480.

As described above and as shown in FIG. 8, the decimal point for the multi-digit number is illuminated in the electrical display 32. Provision may also be made for marking the record chart with an appropriate mark to show the location of the decimal point. This is accomplished by including on the stylus card 33 an additional stylus to the left of each decade or decimal digit. Thus, each decade instead of including 31 styli as shown in FIG. 7 would include 32 styli, the additional stylus being positioned to the left of the stylus identified by the reference character 0. This additional stylus is energized at fixed intervals to indicate the position of the decimal point with the intervals indicating time. To further clarify the record, every tenth decimal point mark is made heavier than the others so that they may be readily identified by an observer in reading the record chart. It is understood that the additional stylus for each decade would include a contact area 33*b* and an electrical connection 33*c* between the contact area and the stylus 33*a* similar to the other styli 33*a* and contact areas 33*b* shown in FIG. 6.

The foregoing method of recording is not only applicable to a single channel recorder such as described above in connection with FIGS. 1–8, but also is applicable to a multi-channel recorder such as shown in FIG. 9. In FIG. 9, the recorder 100 has been shown as including six channels with each channel having its own record chart and digital display. The electrical components of the recorder 100 are contained within the case or housing 111 and are diagrammatically illustrated by the block diagram in FIG. 10. As will be seen in FIG. 10, an input signal from the measured variable is applied to an input switch 112. The number of inputs will correspond to the number of measured variables and these are illustrated by inputs 1, 2N. Thus, if there are six measured variables, there will be six channels for recording as illustrated in FIG. 9. The input switch may be of any suitable known type, one example being the high-speed commutator such as disclosed in "Instruments & Automation," pp. 2064 and 2065 for November, 1957. The high-speed commutator there disclosed is of the solid state type and is manufactured by Wiancko Engineering Co., Pasadena, California. The signals from the input switch 112 are fed through line 113 to a buffer amplifier 114, which may be of any suitable known type such, for example, as a Redcore 260B amplifier manufactured by Packard-Bell. Such amplifier is an isolation amplifier having unity gain and having a very high input impedance in the order of 1000 meghoms and a very low output impedance of less than about .1 ohm. The output from the amplifier 114 is fed by way of line 115 to an analog-to-digital converter 116. The analog-to-digital converter or ADC 116 is an eighteen bit binary coded decimal 2–4–2–1 coded converter. The four coded bits each taking two possible states ("true" or "false") can produce sixteen combinations. However, the recorder uses only ten of the combinations and thus to avoid having one of the six undesirable conditions exist, the ADC is provided with logical constraint. This comprises generating the first 2 of the 2–4–2–1 variable after the 4 and the second 2, but only if both the 4 and the second 2 are "true." Since in both the decimals 8 and 9 this condition exists, the remaining combinations of 4–2–1 account for the six combinations to be constrained.

The ADC 116 may be of a known type including a ring counter, storage, conversion logic, current switches, attenuator and comparator amplifier and suitable control. With a start signal, the ring counter instructs the first flip-flop to turn on a standard weighed current. This current is differentially added to a current produced by putting the input voltage across a fixed resistor. The signal is amplified by the comparator. If the standard current is greater than the analog current, the comparator instructs the flip-flop turned on to turn off. If the analog current is greater than the digital, the flip-flop is left on. The ring counter then instructs the second flip-flop to turn on its standard current. This current plus the last standard current if it were retained is compared with the analog. If D>A, the second flip-flop is turned off otherwise it is left on. The ring counter then turns on the third flip-flop and the process is repeated until all eighteen bits are determined. The digital number is then stored as the states of the flip-flops.

The ADC 116 has four and one-half decades of converted information. The output of each of the decades becomes the input to the decade halfers 118. For each decade, the decade halfers determine whether the number that was converted in that particular decade is less than five or five or more. This is done for the four significant decades of the ADC. The decade halfers decode each decade of the ADC to determine whether that particular number is less than five or five or more. Each decade halfer comprises three "NOR" gates of known construction. As mentioned above, the code that is used in the ADC is the modified 2–4–2–1 code. The decision as to whether in each decade the converted number is less than five or five or greater is determined by noting that for all decisions for a conversion shown for the numbers 4 through 9 of a particular decade the 4 decision is also true. Thus, to decide if the number is five or greater, it is only necessary to eliminate the number 4 from the "4" decision of each decade. One gate is used to decode number 4 and the output of this gate inhibits a gate whose input is the "4" decision of the decade. When the output of this gate is true, the decade has decoded a number greater than or equal to five.

The decade halfer 118 and the ADC 116 are connected to the decoder 120 by cables 119A and 119B. The decoder 120 includes a group of diode "AND" gates arranged to produce a decoding function. The stylus amplifiers 122 obtain their inputs from the output of the decoder 120 and represent a small load on the outputs of the analog-to-digital converter (ADC) and decade halfer. The stylus amplifiers 122 may be of any suitable known type and preferably solid state. The voltage levels at the input to the stylus amplifiers are compatible with those in the ADC converter 116 and decade halfer 118. The output of the stylus amplifier 122 is a decoded pulse in either of two states 0 or 20 volts and is capable of supplying 800 milliamps of current. These values of current and voltage are a function of the record material used and thus may be changed for different record materials as desired. The output switch 124 which receives the output from the stylus amplifiers 122 determines to which of the channels the information determined in the analog-to-digital converter 116 is directed. The output switch 124 is similar to the input switch 112 with the exception that the input switch is a single pole N throw switch and the output switch 124 is an eighty-four pole N throw switch. The numbers 1 through N in the input switch are synchronous to the numbers 1 through N in the output switching.

The sample and hold memory 126 comprises four flip-flops for each decade of the analog-to-digital converter and these flip-flops hold the information that was converted in the analog-to-digital converter while the analog-to-digital converter makes other conversions. The output of these flip-flops is decoded using a decoder similar to the decoder 120. The output of the decoder is in turn sent to a driver which may be a transistor switch capable of supplying enough voltage and current to light the particular lamp that has been decoded by the decoder. Since the conversions occur rather quickly, the lamps would flicker in the last significant places. By storing the output of every $n$th conversion in the flip-flops and using these flip-flops to light the proper lamp, there is provided an anti-flicker arrangement. The flicker rate then is reduced by a factor of $n$. As mentioned above, the displays 32 may be of any suitable type such as a readout that presents a five digit indication of the projection type available from Industrial Electronic Engineers, Inc. Such a device includes individual transparency projectors all focused on a front screen. Thus, it is possible to project a combination of numbers and calibration line symbols as shown in FIG. 8 since separate projection lamps, transparencies, and lenses are used for each of the ten digits for each digit window. An independent sample and hold display may be provided for each channel or a single multiplex sample and hold display for all channels may be provided.

The recorder is capable of sampling each channel at a high rate of speed in the order of 600/$N$ samples per second per channel, where N is the number of channels being used. The paper speed may vary over a wide range from twenty inches per second to one inch per day. The recorder marks at the same rate as it samples. Thus, it marks each channel at 600/$N$ marks per second where N is the number of channels used. While the block diagram shown in FIG. 10 has been described in connection with a multi-channel recorder, such as recorder 100 illustrated in FIG. 9, it is to be understood that the same general circuit is applicable to the single channel recorder 10 illustrated in FIGS. 1–3.

It shall be understood the invention is not limited to the specific arrangement shown and that changes and modifications may be made within the scope of the appended claims.

What is claimed is:

1. A recording system comprising means for feeding a record chart along a predetermined path, stylus means for marking the chart within a limited area, said stylus means including a plurality of electrically conducting styli adapted for selective energization to produce on the chart at a location within said limited area a mark corresponding in position to a significant figure of the digital value of a condition, and number display means disposed adjacent said chart to display a single digit in alignment with said limited area of the chart, said number display means being in electrical circuit with said stylus means for selective energization to produce a readable number corresponding to said significant figure of said digital value of the condition.

2. A recording system according to claim 1 wherein hold means are included in electrical circuit with said number display for retaining said number display without change for a predetermined period of time during which said system records further changes in a condition.

3. A recording system comprising means for feeding a record chart along a predetermined path, stylus means for marking the chart within a limited area, said stylus means including a plurality of electrically conducting styli adapted for selective energization to produce on the chart at a location within said limited area a mark corresponding in position to a significant figure of the digital value of a conditon, and number display means disposed adjacent said chart and in alignment with said limited area of the chart, said number display means being in electrical circuit with said stylus means for selective energization to produce a readable number corresponding to said significant figure of said digital value of the condition, said number display means including an illuminated spot in alignment with said limited area on the chart, the position of said spot being adjustable in a transverse direction to follow the positions of the marks as they are produced on the chart by said stylus means.

4. A recording system comprising means for feeding a record chart along a predetermined path, stylus means for marking the chart within a limited area, said stylus means including a plurality of electrically conducting styli adapted for selective energization to produce on the chart at a location within said limited area a mark corresponding in position to a significant figure of the digital value of a condition, means for supporting said styli in parallel relation, means for energizing said styli in groups with each group including eleven equally spaced styli adapted for the production of calibration lines on a chart of a recorder and two measured quantity marking styli positioned between each of said eleven calibration line styli, and number display means disposed adjacent said chart and in alignment with said limited area of the chart, said number display means being in electrical circuit with said stylus means for selective energization to produce a readable number corresponding to said significant figure of said digital value of the condition.

5. A recording system according to claim 4 wherein said number display includes a set of illuminated calibration lines for each of said groups of styli, and an illuminated spot selectively positioned between adjacent illuminated calibration lines to follow the positions of the marks as they are produced on the chart by said stylus means.

6. A recording system according to claim 4 wherein an end one of said eleven equally spaced styli of each group is for production of a zero calibration line and each group of said styli adjacent said end one of said eleven styli includes an extra stylus for producing a mark corresponding to the position of the decimal point in the value of the measured quantity.

7. In a recording system, the subcombination comprising an adjustable frame structure, a stylus card supported by said frame structure, said stylus card including a flat rigid base member of electrical insulating material and having affixed thereon an electrically conductive circuit pattern including individual electrical contact areas, styli and conducting paths connecting said contact areas with corresponding styli, a contact block including a plurality of outwardly resiliently biased electrical contact pins having thin ends projecting therefrom, said block being disposed adjacent said adjustable frame structure, and means for moving said adjustable frame structure toward said contact block to effect clamping engagement between said contact areas of said stylus card and the ends of said electrical contact pins which project from said block.

8. A subcombination according to claim 7 wherein said contact block is comprised of a plurality of sections of electrical insulating material and includes a plurality of cavities therein corresponding to the number of said electrical contact pins, and each of said electrical contact pins includes spring means within said cavities for producing contact pressure between said contact pins and said contact areas of said stylus card.

9. A subcombination according to claim 8 wherein each of said plurality of contact pins consists of electrically conductive spring wire extending through said contact block and a corresponding one of said cavities and having the intermediate portion in the form of a helix confined within the cavity to provide spring pressure for the contact pin.

10. The subcombination of a stylus assembly for a recorded of measured quantities, said stylus assembly comprising a plurality of electrically conducting styli, means for supporting said styli in parallel relation, and means for energizing said styli in groups with each group including eleven equally spaced styli adapted for the production of calibration lines on a chart of a recorder and two measured-quantity marking styli positioned between each of said eleven calibration-line styli.

11. The subcombination of a stylus assembly for a recorder of measured quantity according to claim 10 wherein an end one of said eleven equally spaced styli of each group is for production of a zero calibration line and each group of said styli adjacent said end one of said eleven styli includes an extra stylus at the left for producing a mark corresponding to the position of the decimal point in the value of the measured quantity.

12. The subcombination of a stylus assembly for a recorder of measured quantity according to claim 11 including means for energizing said extra stylus at fixed intervals to indicate the position of the decimal point with such intervals indicating time and with every tenth decimal point mark being heavy.

13. A recording system comprising means for feeding a record chart along a predetermined path, stylus means for marking the chart within a limited area, said stylus means including a plurality of electrically conducting styli adapted for selective energization to produce on the chart at a location within said limited area a mark corresponding in position to a significant figure of the digital value of a condition, and number display means disposed adjacent said chart and in alignment with said limited area of the chart, said number display means being in electrical circuit with said stylus means for selective energization to produce a readable number corresponding to said significant figure of said digital value of the condition, said means for feeding a record chart along a predetermined path including a timing motor, a switch controlling said motor, pivoted means for actuating said switch, and means carried by said pivoted means for controlling engagement between the chart and said styli, said pivoted means and said switch being relatively positioned so that said motor is energized during movement of said pivoted means toward the chart and prior to engagement of the chart with said styli and said motor continues to be energized during reverse movement of said pivoted means until the chart is out of engagement with said styli.

14. A stylus assembly comprising a sheet of electrical insulating material serving as a support for a plurality of electrical stylus circuits;

said circuits comprising a plurality of narrow electrical conductors disposed in closely spaced parallel array, said conductors being located on centers spaced within approximately one millimeter apart and in number sufficient to extend across substantially the entire width of said support and at one end terminating in stylus structure, rows of closely spaced electrical contact areas distributed over the length of said support with each contact area having a width and length several times the width of said narrow electrical conductors, each of said narrow electrical conductors at its other end terminating at one of said electrical contact areas, electrical contact means including a block of electrical insulating material comprised of two sections, at least one of said sections having a plurality of counterbores, said sections being disposed with said counterbores oriented to form within said block a plurality of cavities internally thereof, a plurality of passageways extending through said block sections and communicating respectively with said cavities, said passageways having a diameter smaller than the diameter of said cavities, and electrically conducting spring wires extending through corresponding ones of said passageways through said block sections, said wires each having a terminal end forming a contact portion engageable in abutting relation with one of said spaced electrical contact areas and including an intermediate portion in the form of a helix disposed in a corresponding one of said cavities to provide outward spring pressure for biasing said terminal end for end-on engagement of said contact portion of the wire which extends beyond an outer face of said block with said one of said spaced electrical contact areas.

References Cited

UNITED STATES PATENTS

| | | | |
|---|---|---|---|
| 843,189 | 2/1907 | Willis | 346—35 |
| 3,059,237 | 10/1962 | Kolb | 346—14 |
| 2,719,775 | 10/1955 | Erving | 346—74 |
| 2,967,083 | 1/1961 | Gallenting | 346—74 |
| 3,071,685 | 1/1963 | Joyce | 346—74 |
| 3,149,895 | 9/1964 | Bernstein | 339—252 |
| 3,196,445 | 7/1965 | Trolio | 346—1 |
| 3,267,485 | 8/1966 | Howell | 346—74 |

FOREIGN PATENTS

| | | |
|---|---|---|
| 864,584 | 4/1961 | Great Britain. |

BERNARD KONICK, *Primary Examiner.*

L. J. SCHROEDER, *Assistant Examiner.*

UNITED STATES PATENT OFFICE

CERTIFICATE OF CORRECTION

Patent No. 3,413,647 November 26, 1968

Norman E. Polster et al.

It is certified that error appears in the above identified patent and that said Letters Patent are hereby corrected as shown below:

Column 12, line 64, "recorded" should read -- recorder --. Column 13, line 2, cancel "at the left".

Signed and sealed this 27th day of October 1970.

(SEAL)
Attest:

Edward M. Fletcher, Jr.
Attesting Officer

WILLIAM E. SCHUYLER, JR.
Commissioner of Patents